US009842205B2

(12) United States Patent
Williams et al.

(10) Patent No.: US 9,842,205 B2
(45) Date of Patent: Dec. 12, 2017

(54) TIME-VARYING PASSWORDS FOR USER AUTHENTICATION

(71) Applicant: AT&T Intellectual Property I, L.P., Atlanta, GA (US)

(72) Inventors: Richard A. Williams, Morganville, NJ (US); Roger B. Aboujaoude, Allen, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 254 days.

(21) Appl. No.: 14/673,339

(22) Filed: Mar. 30, 2015

(65) Prior Publication Data

US 2016/0292413 A1  Oct. 6, 2016

(51) Int. Cl.
*G06F 21/46* (2013.01)
*G06F 21/31* (2013.01)

(52) U.S. Cl.
CPC .............. *G06F 21/46* (2013.01); *G06F 21/31* (2013.01)

(58) Field of Classification Search
CPC ...................................................... G06F 21/46
See application file for complete search history.

(56) References Cited

U.S. PATENT DOCUMENTS

| 4,819,267 A | 4/1989 | Cargile et al. |
| 5,261,000 A | 11/1993 | Hamamoto |
| 5,682,475 A | 10/1997 | Johnson et al. |

(Continued)

FOREIGN PATENT DOCUMENTS

| DE | 102013215407 | 2/2015 |
| WO | 2004111807 | 12/2004 |
| WO | 2014094297 | 6/2014 |

OTHER PUBLICATIONS

Webster's New World Hacker Dictionary, "Time-Dependent Password—Computer Definition", <http://www.yourdictionary.com/time-dependent-password>, Wiley Publishing, Inc., 2010 (5 pages).

(Continued)

*Primary Examiner* — Kambiz Zand
*Assistant Examiner* — Thanh Le
(74) *Attorney, Agent, or Firm* — Hanley, Flight & Zimmerman, LLC

(57) ABSTRACT

Time-varying passwords for user authentication are disclosed. Example methods disclosed herein for password generation include obtaining a base password including characters, determining a first character position of the base password at which a first time-varying data element is to be inserted to determine a time-varying password, the first time-varying data element to be computed based on a time-varying parameter, and determining a first offset to be applied to a value of the time-varying parameter to compute the first time-varying data element. Example methods disclosed herein for password evaluation include accessing a base password including characters, applying a first offset to a value of a time-varying parameter to determine a first time-varying data element to be inserted at a first character position of the base password to determine a time-varying password, and comparing the time-varying password with an input password to perform authentication based on the input password.

20 Claims, 10 Drawing Sheets

(56) References Cited

U.S. PATENT DOCUMENTS

| | | | |
|---|---|---|---|
| 6,904,526 B1 | 6/2005 | Hongwei | |
| 7,171,679 B2 | 1/2007 | Best et al. | |
| 7,363,494 B2* | 4/2008 | Brainard | G06Q 20/32 380/232 |
| 7,650,509 B1 | 1/2010 | Dunning | |
| 8,200,978 B2 | 6/2012 | Li | |
| 8,214,914 B2 | 7/2012 | Eldar | |
| 8,458,484 B2 | 6/2013 | Burke et al. | |
| 8,484,482 B1 | 7/2013 | Cherukumudi et al. | |
| 8,775,820 B1 | 7/2014 | Freeburne | |
| 8,789,166 B2 | 7/2014 | Lu et al. | |
| 8,850,540 B2 | 9/2014 | Lin et al. | |
| 2003/0037262 A1 | 2/2003 | Hillhouse | |
| 2003/0105964 A1 | 6/2003 | Brainard et al. | |
| 2007/0234401 A1 | 10/2007 | Eldar | |
| 2013/0036462 A1 | 2/2013 | Krishnamurthi | |
| 2013/0333010 A1* | 12/2013 | Chougle | G06F 21/46 726/7 |
| 2015/0033303 A1 | 1/2015 | VanBlon et al. | |
| 2015/0207790 A1* | 7/2015 | Lu | H04L 9/3228 726/9 |

OTHER PUBLICATIONS

Wikipedia, "Time-based One-time Password Algorithm", <http://en.wikipedia.org/wiki/Time-based_One-time_Password_Algorithm>, last modified Jan. 6, 2015 (5 pages).

Stata, "Working with dates and times", Manual, Chapter 24, Stata: Data Analysis and Statistical Software, <http://www.stata.com/manuals13/u24.pdf>, 2012 (8 pages).

PARSLEY72, "How can I generate date-dependant passwords?", Stack Overflow, <http://stackoverflow.com/questions/4171445/how-can-i-generate-date-dependent-passwords>, Nov. 13, 2010 (3 pages).

International Searching Authority, "International Search Report and Written Opinion", issued in connection with International Patent Application No. PCT/US2016/024760, dated Jul. 4, 2016 (10 pages).

* cited by examiner

TIME-VARYING PASSWORDS FOR USER AUTHENTICATION

FIELD OF THE DISCLOSURE

This disclosure relates generally to user authentication and, more particularly, to time-varying passwords for user authentication.

BACKGROUND

Modern computing systems and data networks, even those employing what is generally considered to be high levels of security, continue to experience security breaches. To reduce the likelihood and/or frequency of such security breaches, a computing system, data network, etc., may implement one or more rules requiring a user to create a new password at specified intervals (e.g., monthly, weekly, etc.) to replace the user's existing password for accessing the system, network, etc.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
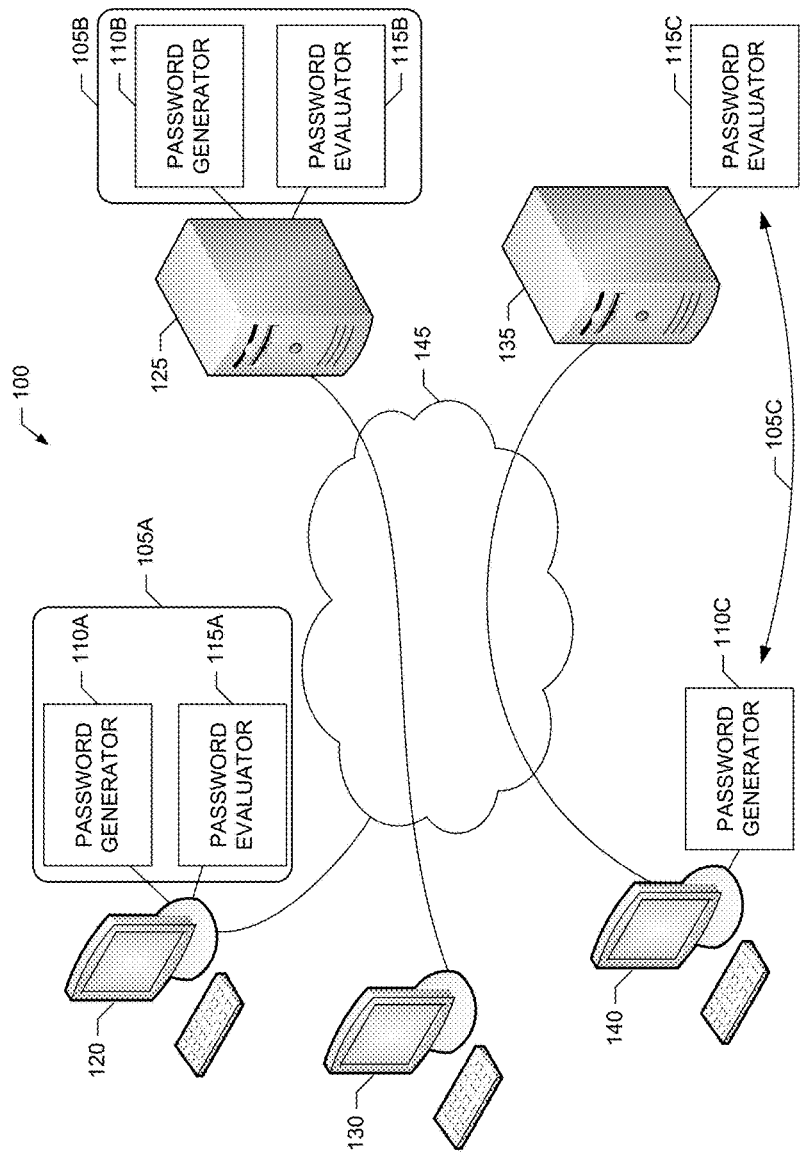
FIG. 1 is a block diagram of an example environment of use for one or more example time-varying password authentication systems implemented in accordance with the teachings of this disclosure.

Time-varying passwords for user authentication are disclosed herein. Example methods for password generation disclosed herein include obtaining a base password including characters (e.g., alphanumeric and/or special characters). Such disclosed example methods also include determining a first character position of the base password at which a first time-varying data element is to be inserted to determine a time-varying password. The first time-varying data element in such examples is to be computed (e.g., by a computing device) based on a time-varying parameter. Such disclosed example methods further include determining a first offset to be applied (e.g., by the computing device) to a value of the time-varying parameter to compute the first time-varying data element.

Some such disclosed example methods for password generation also include determining a data format for the value of the time-varying parameter. For example, the data format can be one of many possible data formats for representing values of the time-varying parameter. In some such examples, the time-varying parameter is a time-of-day parameter determined based on a system clock of the computing device, and the possible data formats include a 12-hour format for representing values of the time-of-day parameter and a 24-hour format for representing values of the time-of-day parameter. Additionally or alternatively, in some such disclosed example methods, the data format is a first data format, and the methods further include determining a second character position of the base password at which a second time-varying data element is to be inserted to determine the time-varying password, the second time-varying data element to be computed (e.g., by the computing device) based on the time-varying parameter. Such disclosed example methods also include determining a second offset (e.g., different from the first offset) to be applied (e.g., by the computing device) to the value of the time-varying parameter to compute the second time-varying data element, and determining a second data format from the possible data formats to be applied (e.g., by the computing device) to the value of the time-varying parameter to compute the second time-varying data element.

In some disclosed example methods for password generation, the time-varying parameter is a first time-varying parameter, and the example methods further including determining a second character position of the base password at which a second time-varying data element is to be inserted to determine the time-varying password. For example, the second time-varying data element can be computed (e.g., by the computing device) based on a second time-varying parameter different from the first time-varying parameter. For example, the first time-varying parameter can be a time-of-day parameter (e.g., determined based on a system clock of the computing device), and the second time-varying parameter can be a day-of-week parameter (e.g., determined based on the system clock of the computing device), a day-of-month parameter (e.g., determined based on the system clock of the computing device), etc.

In some disclosed example methods for password generation, the value of the time-varying parameter is to be represented by a first numerical value, and the offset is a second numerical value to be added to the value of the time-varying parameter to compute the first time-varying data element In some disclosed example methods for password generation, the first time-varying data element includes a set of characters to be inserted at the first character position of the base password to determine the time-varying password. In some such disclosed examples, the set of characters is to be computed (e.g., by the computing device) based on the time-varying parameter and the first offset.

Some disclosed example methods for password generation further include presenting a user interface to permit entry of the base password, the first character position, the time-varying parameter, the first offset, the data format, etc. Such disclosed example methods also include storing the base password, the first character position, the time-varying parameter, the first offset, the data format, etc., to permit determination of the time-varying password (e.g., by the computing device).

Example methods for password evaluation disclosed herein include accessing a base password including characters (e.g., alphanumeric and/or special characters). Such disclosed example methods also include applying a first offset to a value of a time-varying parameter to determine a first time-varying data element to be inserted at a first character position of the base password to determine a time-varying password. Such disclosed example methods further include comparing the time-varying password with an input password to perform authentication based on the input password.

In some such disclosed example methods for password evaluation, applying the first offset includes formatting the value of the time-varying parameter according to a first data format selected from many possible data formats to determine a formatted value of the time-varying parameter. In such disclosed example method, applying the first offset also includes applying the first offset to the formatted value of the time-varying parameter to determine the first time-varying data element to be inserted at the first character position of the base password to determine the time-varying password. For example, the time-varying parameter can be a time-of-day parameter (e.g., determined based on a system clock), and the possible data formats include a 12-hour format for representing values of the time-of-day parameter and a 24-hour format for representing values of the time-of-day parameter. Additionally or alternatively, in some such disclosed example methods for password evaluation, the formatted value is a first formatted value, and the methods further including formatting the value of the time-varying parameter according to a second data format selected from the possible data formats to determine a second formatted value of the time-varying parameter, and applying a second offset (e.g., different from the first offset) to the second formatted value of the time-varying parameter to determine a second time-varying data element to be inserted at a second character position of the base password to determine the time-varying password.

Additionally or alternatively, in some disclosed example methods for password evaluation, the time-varying parameter is a first time-varying parameter, and the example methods further include applying a second offset to a value of a second time-varying parameter to determine a second time-varying data element to be inserted at a second character position of the base password to determine the time-varying password. For example, the first time-varying parameter can be a time-of-day parameter (e.g., determined based on a system clock), and the second time-varying parameter can be a day-of-week parameter (e.g., determined based on the system clock), a day-of-month parameter (e.g., determined based on the system clock of the computing device), etc.

Additionally or alternatively, in some disclosed example methods for password evaluation, the value of the time-varying parameter is represented by a first numerical value, and the offset is a second numerical value added to the value of the time-varying parameter to compute the first time-varying data element.

Additionally or alternatively, in some disclosed example methods for password evaluation, the characters included in the base password are a first group of hashed characters, and accessing the base password includes retrieving the first group of hashed characters from memory.

Additionally or alternatively, in some disclosed example methods for password evaluation, the characters included in the base password are a first group of hashed characters, and the input password includes input characters. Some such disclosed example methods further include processing the input password to determine a group of input characters corresponding to the first group of hashed characters included in the base password. Such disclosed example methods also include hashing the group of input characters to determine a second group of hashed characters, and comparing the second group of hashed characters with the first group of hashed characters to determine a first match result. Furthermore, such disclosed example methods include processing the input password to determine a first input character corresponding to the first time-varying data element of the time-varying password, and comparing the first input character with the first time-varying data element to determine a second match result. Some such disclosed example methods further include evaluating the first match result and the second match result to perform authentication based on the input password.

These and other example methods, apparatus, systems and articles of manufacture (e.g., physical storage media) to generate and/or evaluate time-varying passwords for user authentication are disclosed in greater detail below.

Modern computing systems, data networks, etc. (referred to herein collectively as computing systems) continue to employ passwords to authenticate users and permit system access. As noted above, in an effort to reduce the likelihood and/or frequency of security breaches, a computing system may implement one or more security rules requiring a user to create a new password at specified password expiration intervals (e.g., such as monthly, weekly, etc.) to replace the user's existing password for accessing the system. Furthermore, the security rules may include one or more rules specifying one or more password strength requirements. For example, such a strength requirement may specify that a user password must include a specified mix of alphabetic and numeric characters, and possibly at least one special (e.g., non-alphanumeric) character. Other strength requirements include, but are not limited to, a strength requirement specifying a minimum password length, a strength requirement specifying prohibited password character patterns, a strength requirement specifying that a new password cannot match a prior password used by the user, etc. However, passwords that are changed at specified expiration intervals, even those meeting strength requirements such as those described above, remain vulnerable to identification (e.g., hacking) by unauthorized third parties during the time interval between password creation and password expiration, at which point the user is required to create a new password to replace the user's existing password.

Time-varying passwords for user authentication, as disclosed herein, provide technical solutions for the technical problem of password vulnerability by providing a capability for inserting one or more time-varying data elements (e.g., each of which yielding one or more time-varying characters), which change over time, such as monthly, daily, hourly, by location, etc., into the user's password. Accordingly, such time-varying passwords may change more frequently than passwords governed by an expiration interval, thereby reducing the time intervals during which such time-varying passwords are vulnerable to identification (e.g., hacking) by unauthorized third parties. Moreover, depending on the time-varying parameter(s) used to compute the time-varying data element(s) of a particular time-varying password, some example time-varying passwords may change continuously (or substantially continuously), thereby further reducing, and possibly eliminating, the intervals of time during which the time-varying passwords are vulnerable to identification (e.g., hacking) by unauthorized third parties.

For example, some example time-varying password authentication systems disclosed herein provide a password generation methodology that permits a user to insert (or, in other words, embed) one or more time-varying data elements into a user's base password to form a time-varying password. In some examples, a time-varying data element is based on a time-varying parameter tied to system time and, thus, will have a value that varies based on a particular date, time, etc., at which the time-varying password is evaluated by the authentication system. Additionally or alternatively, in some examples, a time-varying data element is based on a time-varying parameter tied to a location of the user (or the user's device) and, thus, will have a value that varies based on a particular location (e.g., current state, city, zip code, etc.) of the user (or the user's device) at the time when the time-varying password is evaluated by the authentication system. Some disclosed example time-varying password authentication systems permit time-varying passwords that include combinations of such time-varying data elements. Furthermore, some example time-varying password authentication systems disclosed herein permit a user to specify the position (or positions) in the user's base password at which the time-varying data elements(s) is(are) to be inserted. These and other features of such example time-varying password authentication systems are disclosed in further detail below.

Turning to the figures, a block diagram of an example environment of use 100 for example time-varying password authentication systems 105A-C implemented according to the teachings of this disclosure is illustrated in FIG. 1. The example time-varying password authentication systems 105A-C correspond to three different example implementations of time-varying password authentication as disclosed herein. In the illustrated of FIG. 1, the time-varying password authentication systems 105A-C include respective example password generators 110A-C to generate time-varying passwords, and respective example password evaluators 115A-C to evaluate time-varying passwords for user authentication. However, the time-varying password authentication system 105A corresponds to an example centralized implementation in which the example password generator 110A and the example password evaluator 115A are both implemented locally at a computing device, such as an example computing device 120, to support user authentication for permitting local access to the computing device 120. As another example, the time-varying password authentication system 105B corresponds to a second example centralized implementation in which the example password generator 110B and the example password evaluator 115B are both implemented remotely at an example server 125 to support user authentication for permitting access to the server 125 from remote computing devices, such as an example computing device 130. As yet a further example, the time-varying password authentication system 105C corresponds to an example distributed implementation in which the example password evaluator 115C is implemented remotely at an example server 135 to support user authentication for permitting access to the server 135 from remote computing devices, such as an example computing device 140. However, in the example system 105C, the example password generator 110C is implemented locally at the computing device 140, which is being used to access the remote server 135.

The example computing devices 120, 130 and 140 of FIG. 1 can include any number and/or type(s) of computing devices, such as, but not limited to, personal computers, portable computing devices (e.g., laptop/notebook computers, smart phones, tablet computers, etc.), etc., and/or any combination(s) thereof. The example servers 125 and 135 can include any number and/or type(s) of network servers, application servers, data networks, computing devices (e.g., similar to the example computing devices 120, 130 and 140), etc., and/or any combination(s) thereof. Also, in the illustrated example environment of use 100, the example computing device 130 is in communication with the example server 125 via an example network 145, and the example computing device 140 is in communication with the example server 135 via the example network 145. The example network 145 may be implemented by any number and/or type(s) of communication networks, such as one or more wired communication networks (e.g., broadband networks, public telephony networks, etc.), one or more wireless communication networks (e.g., mobile cellular networks, wireless local area networks, etc.), etc., and/or any combination thereof.

As used herein, the phrase "in communication," including variants thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, the password generators 110A-C are responsible for generating (e.g., specifying, creating, etc.) time-varying passwords to be used by the password evaluators 110A-C for performing user authentication. As disclosed in further detail below, the example password generators 110A-C generate a time-varying password for a user (e.g., to be associated with the user's username) by, for example, permitting the user to (i) specify a base password and (ii) specify one or more time-varying parameters (and any associated password parameters) to be used to compute one or more time-varying data elements to be inserted (or otherwise embedded) in the base password to form the time-varying password. As disclosed in further detail below, the example password evaluators 115A-C evaluate a time-varying password by, for example, (i) accessing a stored (e.g., previously specified) base password, (ii) accessing information describing the one or more time-varying parameters (and any associated password parameters) to be used to compute the one or more time-varying data elements specified to be inserted (or otherwise embedded) in the base password to form the time-varying password to be evaluated and (iii) evaluating the value(s) the time-varying parameter(s) (e.g., based on the associated password parameters) to determine the particular time-varying data element(s) to include in the time-varying password at the time of password evaluation. In some examples, the password evaluators 115A-C are also responsible for performing user authentication by, for example, (iv) comparing an input password with an evaluated time-varying password to determine whether the passwords match.

Although the example environment of use 100 includes three (3) example time-varying password authentication systems 105A-C, the use of time-varying for user authentication as disclosed herein is not limited thereto. For example, more or fewer instances of one or more of the example time-varying password authentication systems 105A, B and/or C can be included in the example environment of use 100.

Figure 2:
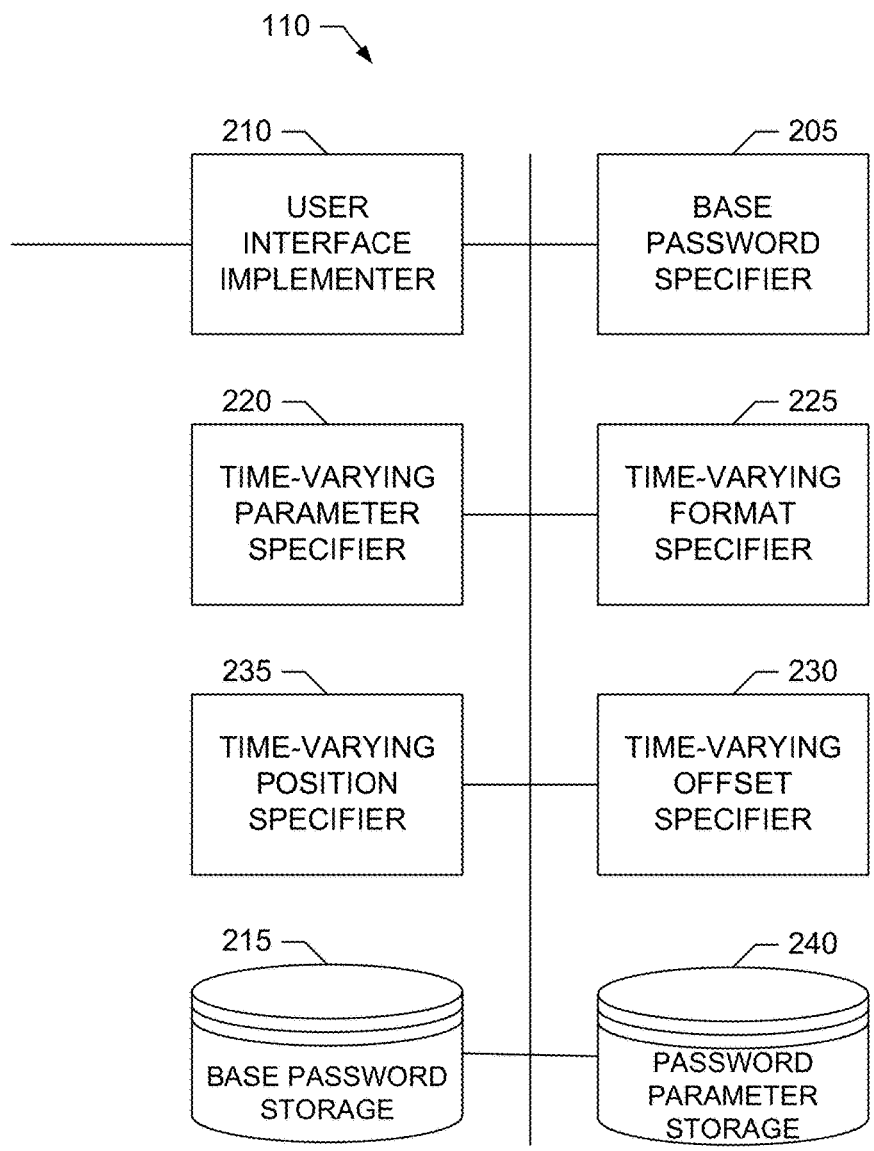
FIG. 2 is a block diagram of an example time-varying password generator that may be used to implement one or more of the example time-varying password authentication systems of FIG. 1.

An example password generator 110 that may be used to implement one or more of the example password generators 110A-C is illustrated in FIG. 2. The example password generator 110 of FIG. 2 includes an example base password specifier 205 to permit a user to specify a base password to be used to generate the user's time-varying password (e.g., to be associated with the user's username). In some examples, the base password specifier 205 accepts a sequence of one or more characters (or, more generally, data elements) that is/are to form the base password from which a time-varying password is to be generated. In some examples, the characters accepted by the base password specifier 205 include alphanumeric characters (which include alphabetic characters and/or numeric characters), special characters (e.g., non-alphanumeric characters, such a punctuation symbols, mathematical operators, etc.), etc., or any combination thereof. For example, the base password specifier 205 could accept the alphanumeric character sequence "applepie" as a base password from which a time-varying password is to be generated. In the illustrated example of FIG. 2, the base password specifier 205 obtains the sequence of character(s) forming the base password from an example user interface implementer 210, which is disclosed in further detail below.

In the illustrated example of FIG. 2, the base password specifier 205 stores an obtained base password in an example base password storage 215. The example base password storage 215 may be implemented by any number, type(s) and/or combination of data storage elements, memories, etc., such as the example memory 914 and/or the example storage device(s) 928 of the example processing system 900 of FIG. 9, which is described in further detail below. In some examples, the base password specifier 205 hashes (or otherwise encrypts) the base password by performing any one or more hashing operation(s) (or other encryption operation(s)) on the sequence of characters forming the base password prior to storing the base password in the example base password storage 215. In some examples, the base password storage 215 stores multiple base passwords associated with the same and/or different users (e.g., with the same and/or different usernames), and which may be generated by one or more password generators (e.g., including the example password generator 110 of FIG. 2). By storing hashed (or otherwise encrypted) base passwords in the base password storage 215, the original base passwords are protected from interception by an unauthorized third party.

The example password generator 110 of FIG. 2 also includes an example time-varying parameter specifier 220 to specify one or more time-varying parameters that are to be evaluated to determine (e.g., compute) one or more time-varying data elements to be combined with (e.g., inserted/embedded into) the base password obtained by the base password specifier 205 to generate a corresponding time-varying password for a user (e.g., to be associated with the user's username). In the illustrated example of FIG. 2, the time-varying parameter specifier 220 determines the time-varying parameter(s) to be evaluated to generate the time-varying data element(s) a time-varying password from the example user interface implementer 210, which is disclosed in further detail below. Examples of time-varying parameters that can be specified by the varying parameter specifier 220 for use in determining the time-varying data element(s) of a time-varying password include, but are not limited to, a time-of-day parameter (e.g., to be determined based on a system clock of a computing device evaluating the time-varying password), a day-of-week parameter (e.g., to be determined based on a system clock of a computing device evaluating the time-varying password), a day-of-month parameter (e.g., to be determined based on a system clock of a computing device evaluating the time-varying password), a device location parameter (e.g., to be determined based on a global positioning system (GPS) feature and/or other location/position determining feature of a computing device evaluating the time-varying password), etc. In some examples, the same time-varying parameter is specified for generating different time-varying data elements to be included in the time-varying password. In some examples, different time-varying parameters are specified for generating different time-varying data elements to be included in the time-varying password. In some examples, the same time-varying parameter is specified for generating some of the time-varying data elements to be included in the time-varying password, whereas different time-varying parameters are specified for generating others of the time-varying data elements to be included in the time-varying password. Examples of specifying the time-varying parameter(s) to be evaluated to determine the time-varying data element(s) to be included in a time-varying password are provided below.

The example password generator 110 of FIG. 2 further includes an example time-varying format specifier 225 to specify format(s) for values of the time-varying parameter(s) used to determine the time-varying data element(s) to be included in the time-varying password for the user. In the illustrated example of FIG. 2, the time-varying format specifier 225 determines the format(s) for the time-varying parameters(s) from the example user interface implementer 210, which is disclosed in further detail below. In some examples, the time-varying format specifier 225 permits a particular format, which is to be used represent the value of a time-varying parameter, to be selected from a set of possible data formats for representing values of the time-varying parameter. For example, if the time-varying parameter is a time-of-day parameter (e.g., determined based on a system clock of a computing device), then possible data formats may include a 12-hour format for representing values of the time-of-day parameter and a 24-hour format for representing values of the time-of-day parameter. In some examples, the format specified for representing the value of a time-varying parameter is dependent on the particular time-varying data element to be computed from that time-varying parameter. For example, if multiple time-varying data elements of a time-varying password are to be computed from the same time-varying parameter, in some examples the same format of the time-varying parameter may be specified for all of the multiple time-varying data elements, whereas in other examples, different formats of the time-varying parameter may be specified for some or all of the multiple time-varying data elements. Examples of specifying the format(s) of the time-varying parameter(s) to be evaluated to determine the time-varying data element(s) of a time-varying password are provided below.

The example password generator 110 of FIG. 2 further includes an example time-varying offset specifier 230 to specify offset(s) to be applied to value(s) of time-varying parameter(s) to compute the time-varying data element(s) of the time-varying password for the user. In the illustrated example of FIG. 2, the time-varying offset specifier 230 determines the format(s) for the time-varying parameters(s) from the example user interface implementer 210, which is disclosed in further detail below. In some examples, the time-varying offset specifier 230 permits the user to specify an offset to be applied to the value (e.g., formatted as specified by the time-varying format specifier 225) of a time-varying parameter to determine the corresponding time-varying data element to be included in the time-varying password. For example, if the possible values of a given time-varying parameter are numeric characters, then the time-varying offset specifier 230 may permit an offset that is a numeric value to be specified for adding to (or subtracted from) the numeric value of the time-varying parameter to determine the corresponding time-varying data element for inclusion in the time-varying password. As another example, if the possible values of a given time-varying parameter are alphabetic characters, then the time-varying offset specifier 230 may permit an offset that is a numeric value to be specified for adding to (or subtracted from) a coded representation (e.g., an ASCII code) of the value of the time-varying parameter to determine the corresponding time-varying data element for inclusion in the time-varying password. In some examples, the time-varying offset specifier 230 permits different offsets to be specified for different time-varying data elements to be included in a time-varying password.

In some examples, the offset(s) specified by the time-varying offset specifier 230 are to be treated as modulo offset(s) when they are used to compute the corresponding time-varying data elements to be included in a time-varying password. For example, adding an offset to the value of a time-varying parameter may result in an adjusted value that exceeds the range of permissible values for the time-varying parameter. In some examples, the offset is treated as a modulo offset when applying the offset to the value of a time-varying parameter by subtracting a value from the adjusted value when the adjusted value exceeds the range of permissible values for the-varying parameter to cause the resulting adjusted value to remain in the range of permissible values for the time-varying parameter. For example, a time-varying day-of-week parameter may have values that range from "1" to "7," with "1" representing Sunday and "7" representing Saturday. If an offset is specified for use with this day-of-week parameter, applying the offset to the day-of-week parameter may result in a value that exceeds "7." Accordingly, if a modulo offset is specified for this day-of-week parameter, and the result of applying the offset to the value of the day-of-week parameter exceeds "7," which is the largest permissible value, then the adjusted value may be decreased by the value "7" (or multiples of "7") to yield a resulting adjusted value that again is in the range of "1" to "7." In some examples, the time-varying offset specifier 230 permits specification of whether a particular offset is to be treated as a modulo offset (or not). (If an offset is not to be treated as a modulo offset, then the resulting time-varying data element determined by applying the offset to a value of a time-varying parameter is permitted to exceed the range of values for the time-varying parameter.) Examples of specifying the format(s) of the time-varying parameter(s) to be evaluated to determine the time-varying data element(s) of a time-varying password are provided below.

The example password generator 110 of FIG. 2 further includes an example time-varying position specifier 235 to specify one or more character positions of the base password (e.g., obtained by the base password specifier 205) at which one or more respective time-varying data elements is/are to be inserted (embedded) to form the time-varying password for the user. In some examples, the character position(s) are specified relative to the original characters of the base password, whereas in other examples employing hashing (or encryption) of the base password, the character position(s) are specified relative to the hashed characters forming the hashed version of the base password. In the illustrated example of FIG. 2, the time-varying position specifier 235 determines the character position(s) of the base password at which the time-varying data element(s) is(are) to be inserted (embedded) into the base password from the example user interface implementer 210, which is disclosed in further detail below. In some examples, the time-varying position specifier 235 can be configured to specify a character position of the base password after which a time-varying data element is to be inserted. Additionally or alternatively, in some examples, the time-varying position specifier 235 can be configured to specify a character position of the base password before which a time-varying data element is to be inserted. Additionally or alternatively, in some examples, the time-varying position specifier 235 can be configured to specify a character position of the base password at which a character of the base password is to be replaced by a time-varying data element. In some examples, if multiple time-varying data element are specified to be inserted at the same character position of the base password, the time-varying position specifier 235 implements any appropriate tie-breaking procedure to specify an order for inserting the multiple time-varying data elements at the specified character position of the base password. For example, the time-varying position specifier 235 may determine the order based on the order in which the password generator 110 receives information specifying the different time-varying data elements for inclusion in the time-varying password being created. Examples of specifying the character positions(s) at which the time-varying data element(s) is(are) to be inserted (embedded) in a time-varying password are provided below.

The example password generator 110 of FIG. 2 includes an example password parameter storage 240 to store the password parameters specified by the example time-varying parameter specifier 220, the example time-varying format specifier 225, the example time-varying offset specifier 230 and/or the example time-varying position specifier 235 for a given time-varying password. In some examples, for a given time-varying password generated for a given user, the password parameter storage 240 stores, for each time-varying data element to be included in the time-varying password, the character position for the time-varying data element, as well as the time-varying parameter, the time-varying parameter format (if any) and the offset (if any) to be used to compute that time-varying data element. The example password parameter storage 240 may be implemented by any number, type(s) and/or combination of data storage elements, memories, etc., such as the example memory 914 and/or the example storage device(s) 928 of the example processing system 900 of FIG. 9, which is described in further detail below. In some examples, the base password storage 215 and the password parameter storage 240 are implemented by the same storage elements, memories, etc., whereas in other examples, the base password storage 215 and the password parameter storage 240 are implemented by separate storage elements, memories, etc.

The example password generator 110 of FIG. 2 includes the example user interface implementer 210 to implement a user interface with which one or more of the example time-varying parameter specifier 220, the example time-varying format specifier 225, the example time-varying offset specifier 230 and/or the example time-varying position specifier 235 may obtain their respective time-varying password parameters. In some examples, the user interface implementer 210 implements a text-based interface by which a user can enter the base password of a time-varying password and the password parameters defining the time-varying data elements of the time-varying password. In some such examples, the user interface implementer 210 may define a set of one or more time variables representing the time-varying parameters capable of being selected by a user for user in determining the time-varying data elements to be including the user's time-varying password. For example, the user interface implementer 210 may define the variable "d1" to be the day-of-week parameter, the variable "h1" to be the hour portion of the time-of-day parameter, the variable "m1" to be the minute portion of the time-of-day parameter, etc. In some examples, the user interface implementer 210 further defines special characters to be used to indicate that a time variable is being included in a time-varying password being generated for a user. For example, if the special characters used to indicate time variable are brackets, then when text in a user's created password is set-off with brackets (or whatever special character(s) is(are) used to indicate time variables), then the text in the brackets is interpreted as corresponding to the indicated time variable, rather than just being interpreted as text. For example, if the text "[d1]" is included in a user's password, the text "[d1]" is replaced with the current value of the day-of-week parameter when evaluating the user's password.

For example, consider the password "apple1pie4." In some examples, a user could use the user interface implementer 210 to replace the number "1" in the password with the day-of-week parameter by replacing "1" with "[d1]". Similarly, the user could replace the number "4" in the password with the hour portion of the time-of-day parameter by replacing "4" with "[M]". In such an example, the resulting password specified by the user via the user interface implementer 210 would be "apple[d1]pie[h1]", with the base password corresponding to the remaining text that does not correspond to time variables (e.g., "applepie" in this example). Then, on Nov. 15, 2014 at 11:05 AM, the user's password would evaluate to "apple15pie11," but on Dec. 4, 2014 at 8:22 AM, the user's password would evaluate to "apple4pie8." Thus, to access a computing system using this time-varying password, on Nov. 15, 2014 at 11:05 AM, the user would need to enter "apple15pie11" as the user's password, whereas to access the data network on Dec. 4, 2014 at 8:22 AM, the user would need to enter "apple4pie8" as the user's password.

Figure 3:
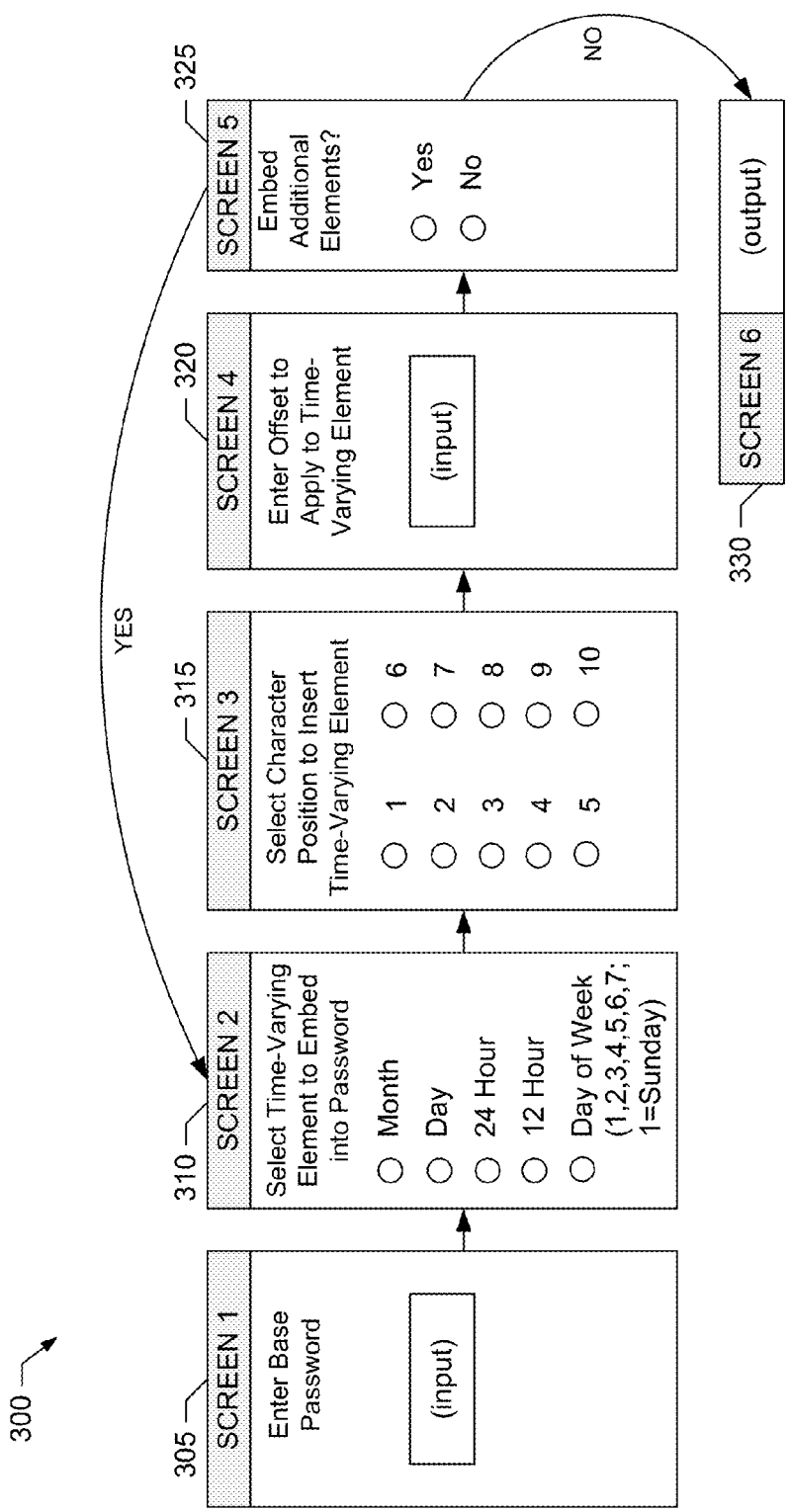
FIG. 3 illustrates an example user interface that may be implemented by the example time-varying password generator of FIG. 2.

In some examples, the user interface implementer 210 implements a graphical user interface (GUI) by which a user can enter the base password of a time-varying password and the password parameters defining the time-varying data elements of the time-varying password. An example GUI 300 capable of being implemented by the example user interface implementer 210 is illustrated in FIG. 3. In the illustrated example of FIG. 3, the GUI 300 implemented by the user interface implementer 210 includes a first example screen 305 via which a user is prompted for a base password for a time-varying parameter being created. The example GUI 300 also includes a second example screen 310 via which the user is prompted to select a time-varying parameter to be used to compute a time-varying data element to include in the time-varying password being created. In the illustrated example of FIG. 3, the second example screen 310 also permits the user to select among different possible formats for formatting the value of the selected time-varying parameter. The example GUI 300 further includes a third example screen 315 via which the user is prompted to select a character position at which the time-varying data element computed from the time-varying parameter selected via the screen 310 is to be inserted in the base password entered via the screen 305. In some examples, the user interface implementer 210 counts the number of characters included in the base password entered via the screen 305 to determine the selectable character positions displayed in the screen 315. In some examples, the user interface implementer 210 determines the selectable character positions displayed in the screen 315 based on the number of hashed characters included in hashed versions of the base password (e.g., when hashing is performed on base passwords). The example GUI 300 also includes a fourth example screen 320 via which the user is prompted to input an offset to be applied to the value of the time-varying parameter selected via the screen 310 when computing the time-varying data element to insert at the character position specified via the screen 315.

The example GUI 300 of FIG. 3 further includes a fifth example screen 325 via which the user is prompted to indicate whether additional time-varying data elements are to be inserted in the base password to create the time-varying password for the user. In the illustrated example, if the user interface implementer 210 detects via the example screen 325 that additional time-varying data elements are to be included in the time-varying password, the user interface implementer 210 again presents screens 310-325 to permit the parameters for these additional time-varying data element(s) to be specified. Otherwise, if the user interface implementer 210 detects via the example screen 325 that additional time-varying data elements are not to be included in the time-varying password, the example GUI 300 includes an example sixth screen 330 via which the resulting time-varying password created for the user is presented (e.g., for validation). (In examples employing hashing, the example sixth screen 330 may be constructed to display the time-varying data elements in the selected position of the original, non-hashed base password, to allow a user to verify the specified password parameters.) Thus, the illustrated example GUI 300 of FIG. 3 supports inclusion of multiple time-varying data elements in a time-varying password (e.g., by inserting the multiple time-varying data elements in a base password), with different time-varying data elements being based on the same or different combinations of time-varying parameters, formats and/or offsets.

Figure 4:
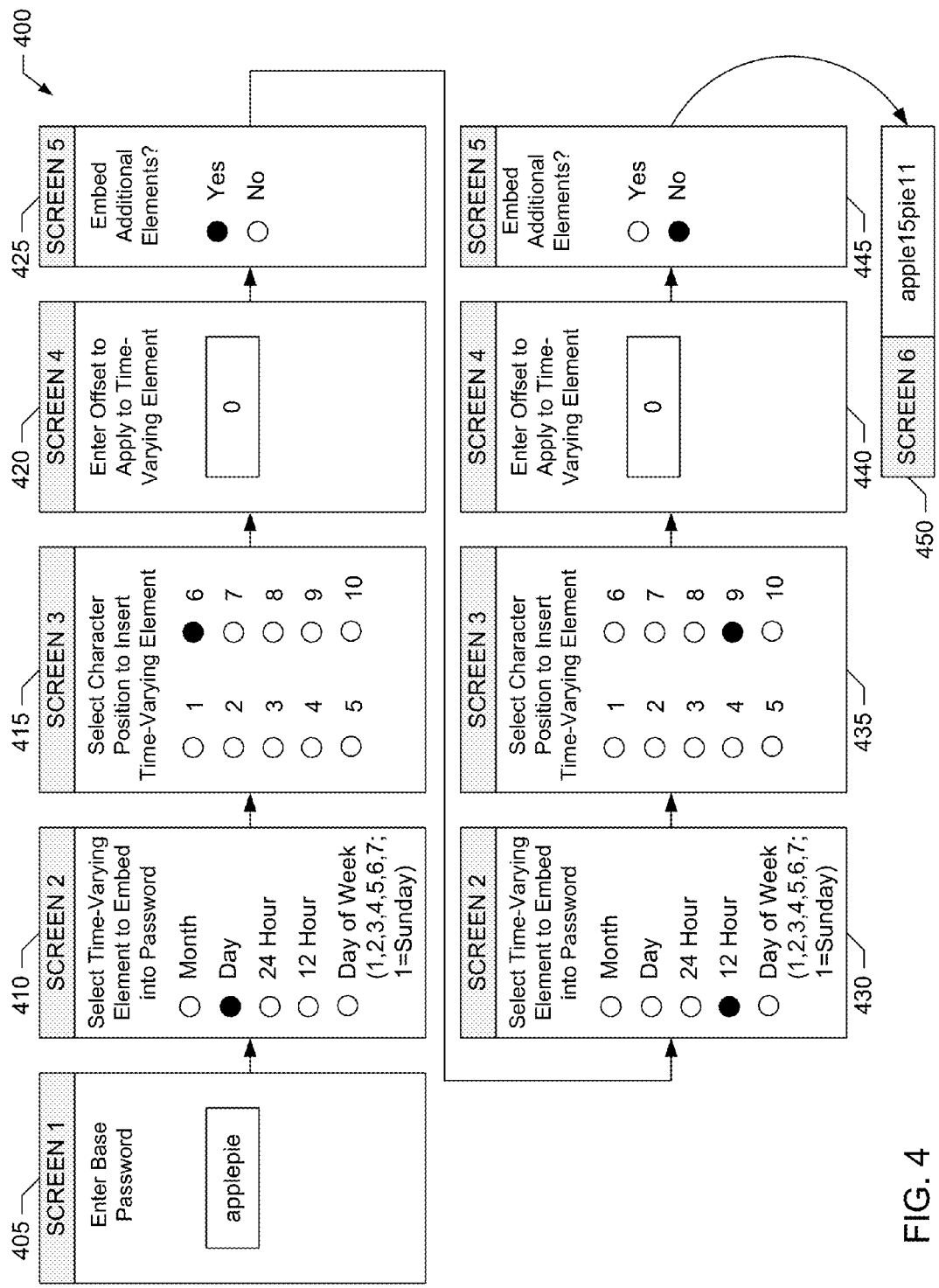
FIG. 4 illustrates an example sequence of operations of the example user interface of FIG. 3 to generate an example time-varying password.

An example sequence of operations 400 of the example GUI 300 to create a time-varying password for a user is illustrated in FIG. 4. The example sequence of operations 400 of FIG. 4 begins at operation 405 at which the GUI 300 presents the first GUI screen, which prompts the user to enter a base password via the first GUI screen. In the illustrated example, the user enters "applepie". At operation 410, the GUI 300 presents the second GUI screen, which prompts the user to select a time-varying parameter (and format, if applicable) to be used to compute a first time-varying data element to include in a time-varying password being created for the user. In the illustrated example, the user selects the day-of-month parameter. At operation 415, the GUI 300 presents the third GUI screen, which prompts the user to select the character position at which the first time-varying data element is to be inserted into the base password. In the illustrated example, the user selects the $6^{th}$ character position. At operation 420, the GUI 300 presents the fourth GUI screen, which prompts the user to enter an offset to be applied to the time-varying parameter to compute the first time-varying data element. In the illustrated example, the user enters a value of zero for the offset. At operation 425, the GUI 300 presents the fifth GUI screen, which prompts the user to indicate whether another time-varying data element is to be inserted in the base password. In the illustrated example, the user indicates "Yes," which instructs the user interface implementer 210 that another time-varying data element is to be included in the time-varying password.

Accordingly, at operation 430, the GUI 300 again presents the second GUI screen, which prompts the user to select a time-varying parameter (and format, if applicable) to be used to compute a second time-varying data element to include in the time-varying password being created for the user. In the illustrated example, the user selects the hour portion of the time-of-day parameter, and the format to be the 12-hour format. At operation 435, the GUI 300 again presents the third GUI screen, which prompts the user to select the character position at which the second time-varying data element is to be inserted into the base password. In the illustrated example, the user selects the $9^{th}$ character position. At operation 440, the GUI 300 again presents the fourth GUI screen, which prompts the user to enter an offset to be applied to the time-varying parameter to compute the second time-varying data element. In the illustrated example, the user enters a value of zero for the offset. At operation 445, the GUI 300 again presents the fifth GUI screen, which prompts the user to indicate whether another time-varying data element is to be inserted in the base password. In the illustrated example, the user indicates "No," which instructs the user interface implementer 210 that no more time-varying data elements are to be included in the time-varying password.

Accordingly, at operation 450, the GUI 300 presents the sixth GUI screen to present the time-varying password created for the user. In the illustrated example of FIG. 4, the current date and time is assumed to be Nov. 15, 2014 at 11:05 AM. Thus, the time-varying password displayed at operation 450 evaluates to "apple15pie11" in the illustrated example. As another example, if an offset of "−3" had been entered at operation 440, the second time-varying data element in the time-varying password would evaluate to 11+(−3)=8, yielding a time-varying password of "apple15pie8." As yet a further example, if an offset of "+2" had been entered at operation 440, the second time-varying data element in the time-varying password would evaluate to 11+2=13 if the offset is not configured to be a modulo offset, and would evaluate to a value of $(11+2)_{mod12}=1$ if the offset is configured to be a modulo offset. In such an example, the evaluated time-varying password would be "apple15pie13" if the offset is not configured to be a modulo offset, and "apple15pie1" if the offset is configured to be a modulo offset." The illustrated examples of FIGS. 3 and 4 also demonstrate that a given time-varying data element can result in one or more characters being included in the time-varying password depending on the value of the time-varying parameter used to compute the time-varying data element.

Figure 5:
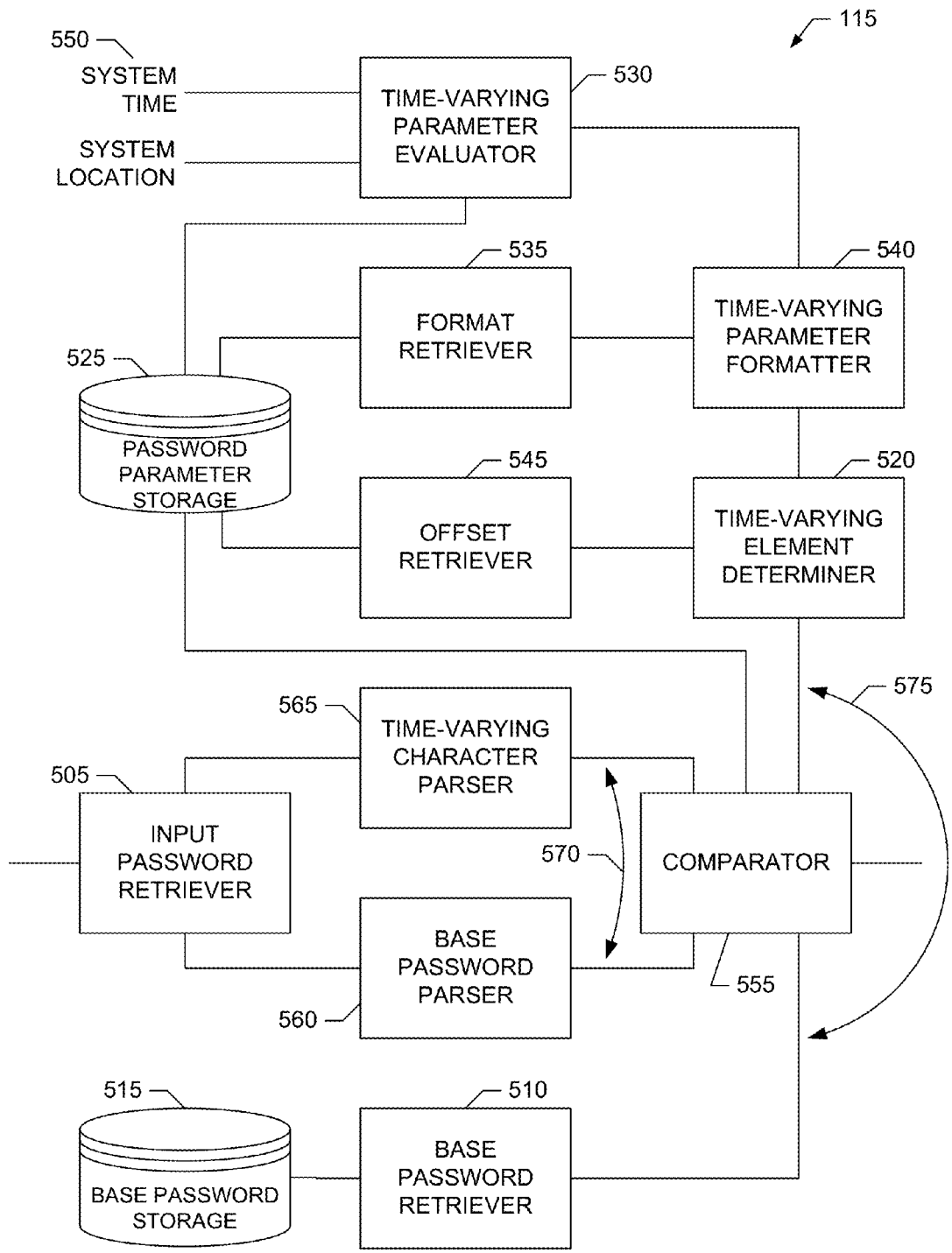
FIG. 5 is a block diagram of an example time-varying password evaluator that may be used to implement one or more of the example time-varying password authentication systems of FIG. 1.

An example password evaluator 115 that may be used to implement one or more of the example password evaluators 115A-C is illustrated in FIG. 5. The example password evaluator 115 of FIG. 5 includes an example input password retriever 505 to access an input password to be compared against one or more time-varying passwords to, for example, determine whether the input password is valid, perform user authentication, etc. In some examples, such as when the example password evaluator 115 is implemented locally at a computing device (e.g., such as the example computing device 120) to support user authentication for permitting local access to the computing device, the input password retriever 505 accesses an input password entered locally at the computing device. Additionally or alternatively, in some examples, such as when the example password evaluator 115 is implemented remotely at a server (e.g., such as the example server 125 and/or 135) to support user authentication for permitting remote access to the server, the input password retriever 505 accesses an input password that was entered locally at a computing device but then transmitted to the password evaluator 115 (e.g., via the example network 145).

The example password evaluator 115 of FIG. 5 also includes an example base password retriever 510 to access (e.g., in response to receipt of the input password by the input password retriever 505) a base password forming a time-varying password to be compared with the input password. In the illustrated example of FIG. 5, the base password retriever 510 accesses the base password from an example base password storage 515. The example base password storage 515 may be the same as or different from the example base password storage 215 of FIG. 2, and may be implemented by any number, type(s) and/or combination of data storage elements, memories, etc., such as the example memory 1014 and/or the example storage device(s) 1028 of the example processing system 1000 of FIG. 10, which is described in further detail below. In some examples, the base password storage 515 stores multiple base passwords associated with the same and/or different users (e.g., associated with the same and/or different usernames), and which may be generated by one or more password generators (e.g., such the example password generator 110 of FIG. 2). Furthermore, in some examples, the base password(s) stored in the base password storage 515 are hashed or otherwise encrypted. As noted above, storing hashed (or otherwise encrypted) base passwords in the base password storage 515, the original base passwords are protected from interception by an unauthorized third party. In some examples in which multiple, possible time-varying passwords are associated with a given user, the base password retriever 510 retrieves base passwords forming the corresponding time-varying passwords associated with the given user sequentially (or in any other order) from the base password storage 515.

To determine the time-varying password for a given base password accessed by the base password retriever 510 from the base password storage 515, the example password evaluator 115 of FIG. 5 further includes an example time-varying element determiner 520. The example time-varying element determiner 520 determines the time-varying data element(s) to be inserted in the accessed base password to determine the corresponding time-varying password. In the illustrated example of FIG. 5, the time-varying data element(s) to be included in the time-varying password are specified by password parameters stored in an example password parameter storage 525. As such, in some examples, the password parameter storage 525 includes information linking a given base password in the base password storage 515 to the password parameter(s) specifying the corresponding time-varying data element(s) to be inserted in the given password to determine a corresponding time-varying password. Additionally or alternatively, in some examples, for a given time-varying data element to be included in a time-varying password, the password parameter storage 525 stores a character position for the time-varying data element, as well as a time-varying parameter, a time-varying parameter format (if any) and an offset (if any) to be used to compute that time-varying data element. The example password parameter storage 525 may be the same as or different from the password parameter storage 240 of FIG. 2, and may be implemented by any number, type(s) and/or combination of data storage elements, memories, etc., such as the example memory 1014 and/or the example storage device(s) 1028 of the example processing system 1000 of FIG. 10, which is described in further detail below. In some examples, the base password storage 515 and the password parameter storage 525 are implemented by the same storage elements, memories, etc., whereas in other examples, the base password storage 515 and the password parameter storage 525 are implemented by separate storage elements, memories, etc.

In the illustrated example of FIG. 5, the time-varying element determiner 520 determines the time-varying data element(s), which is(are) to be inserted in an accessed base password to determine a corresponding time-varying password, from information provided by one or more of an example time-varying parameter evaluator 530, an example format retriever 535, an example time-varying parameter formatter 540 and an example offset retriever 545. For example, for a given time-varying data element to be computed for inclusion in a given time-varying password, the example time-varying parameter evaluator 530 accesses (e.g., from password parameter storage 525) the password parameter(s) specifying this time-varying data element to determine the time-varying parameter to be used to compute the time-varying data element. Based on the accessed password parameter(s), the time-varying parameter evaluator 530 computes a present value of the specified time-varying parameter to be used to compute the corresponding time-varying data element. Examples of time-varying parameter values capable of being specified and, thus, computed by the time-varying parameter evaluator 530 include, but are not limited to, a time-of-day parameter (and/or different portions thereof, such as an hour portion of the time-of-day, a minute portion of the time-of-day, etc.), a day-of-week parameter, a day-of-month parameter, a month-of-year parameter, a location parameter, etc. In the illustrated example, the time-varying parameter evaluator 530 the time-varying parameters evaluated by the time-varying parameter evaluator 530 are based on example system functions 550 accessible by the time-varying parameter evaluator 530, such as an example system time function (e.g., implemented by a system block), example system location function (e.g., implemented by a GPS and/or other location/positioning system to provide location data when the location of the password evaluator 115 corresponds to the location of the user, and/or implemented by a communication interface to receive location data from a remote computing device when the user is located remotely from the password evaluator 115).

The example password evaluator 115 of FIG. 5 includes the example format retriever 535 to access (e.g., from the password parameter storage 525), for a given time-varying data element being computed, a format, if specified, to represent the value of the time-varying parameter being used to compute the time-varying data element. For example, if the time-varying parameter is a time-of-day parameter, then possible data formats may include a 12-hour format for representing values of the time-of-day parameter and a 24-hour format for representing values of the time-of-day parameter. As another example, if the time-varying parameter is a location parameter, then possible data formats may include, for example, a 5 digit zip code format, a 9 digit (e.g., zip+4) zip code format, etc. In the illustrated example, the time-varying parameter formatter 540 applies the specified format, if any, retrieved by the format retriever 535 to the value of the time-varying parameter determined by the time varying-parameter evaluator 530 for use in computing the given time-varying data element under consideration.

The example password evaluator 115 of FIG. 5 further includes the example offset retriever 545 to access (e.g., from the password parameter storage 525), for a given time-varying data element being computed, an offset, if specified, to be applied to the value of the time-varying parameter being used to compute the time-varying data element. In some examples, for a given time-varying data element, the offset may be a positive (or negative) value to be added to (or subtracted from) the value of the time-varying parameter being used to compute the time-varying data element. Furthermore, in some examples, the offset specified for a given time-varying data element may or may not be a modulo offset, as described above. In the illustrated example of FIG. 5, to compute a given time-varying data element, the time-varying element determiner 520 applies (e.g., adds/subtracts, with or without a modulo operation, as appropriate) the offset, if any, specified for the time-varying data element (e.g., as retrieved by the offset retriever 545) to the value of the time-varying parameter specified for the time-varying data element (e.g., as evaluated by the time-varying parameter evaluator 530 and formatted by the time-varying parameter formatter 540). The time-varying element determiner 520 further performs such operations for each time-varying data element to be included in a given time-varying password being evaluated.

The example password evaluator 115 of FIG. 5 includes an example comparator 555 to compare a given evaluated time-varying password with the input password obtained by the example input password retriever 505. In some examples, such as when the base password storage 515 stores base passwords in non-hashed (e.g., clear text) format, the comparator 555 inserts the time-varying data element(s) determined by the time-varying element determiner 520 for the given evaluated time-varying password at the appropriate character positions (e.g., as specified by the password parameter(s) in the password parameter storage 525) of the corresponding base password retrieved by the base password retriever 510. In some such examples, the comparator 555 then performs a character-by-character comparison of the input password with the evaluated time-varying password to determine whether the passwords match. In some examples, if the passwords match, the comparator 555 indicates that password comparison (e.g., and/or user authentication) was successful. Otherwise, if the passwords do not match, the comparator 555 causes the base password retriever 510 to retrieve the next base password for the next time-varying password, if any, to be compared with the input password, and causes the time-varying element determiner 520 to determine the time-varying data element(s) to include in that next time-varying password.

However, in some examples, such as when the base password storage 515 stores base passwords in hashed (or otherwise encrypted) format, the comparator 555 compares the base password of the given evaluated time-varying password with the input password separately from comparing the time-varying data portions of the given evaluated time-varying password with the input password. In some such examples, the password evaluator 115 of FIG. 5 includes an example base password parser 560 to determine the base password portion of the input password, and an example time-varying character parser 565 to determining the time-varying portion of the input password. For example, the time-varying character parser 565 can determine the time-varying portion of the input password (e.g., accessed by the input password retriever 505) by selecting the input password characters corresponding to the character position(s) of the time-varying data elements in the given time-varying password being compared. The base password parser 560 can then select the remaining characters of the input password to be the base password portion of the input password, which is to correspond with the base password of the time-varying password being compared. In some examples, the base password parser 560 further performs the same hashing operation(s) (encryption operation(s)) on the base password portion of the input password as were performed on the base password of the time-varying password being compared to permit comparison of the input password with the time-varying password.

As shown in the illustrated example of FIG. 5, the base password portion of the input password determined by the base password parser 560 and the time-varying portion of the input password determined by the time-varying character parser 565 form an example input password 570 that the comparator 555 compares with a given example time-varying password 575 formed from a given bass password accessed by the base password retriever 510 and the time-varying data element(s) determined by the time-varying element determiner 520 (as well as the position information for the time-varying data element(s) stored in the example password parameter storage 525). In some examples, the comparator 555 compares the input password 570 with the given time-varying password 575 by: (i) comparing the base password of the time-varying password 575 with the base password portion (after hashing/encryption, if appropriate) of the input password to determine a first match result, and (ii) comparing the time-varying data element(s) of the time-varying password with the corresponding character(s) of the time-varying portion of the input password to determine a second match result. In some such examples, if both match results are successful, the comparator 555 indicates that password comparison (e.g., and/or user authentication) was successful. Otherwise, if one or both of the match results are unsuccessful, the comparator 555 causes the base password retriever 510 to retrieve the next base password for the next time-varying password, if any, to be compared with the input password, and causes the time-varying element determiner 520 to determine the time-varying data element(s) to include in that next time-varying password.

While example manners of implementing the example time-varying password authentication systems 105A-C are illustrated in FIGS. 1-5, one or more of the elements, processes and/or devices illustrated in FIGS. 1-5 may be combined, divided, re-arranged, omitted, eliminated and/or implemented in any other way. Further, the example password generators 110 and/or 110A-C, the example password evaluators 115 and/or 115A-C, the example computing device 120, the example server 125, the example computing device 130, the example server 135, the example computing device 140, the example network 145, the example base password specifier 205, the example user interface implementer 210, the example time-varying parameter specifier 220, the example time-varying format specifier 225, the example time-varying offset specifier 230, the example time-varying position specifier 235, the example GUI 300, the example input password retriever 505, the example base password retriever 510, the example time-varying element determiner 520, the example time-varying parameter evaluator 530, the example format retriever 535, the example time-varying parameter formatter 540, the example offset retriever 545, the example comparator 555, the example base password parser 560, the example time-varying character parser 565 and/or, more generally, the example time-varying password authentication systems 105A, B, and/or C of FIGS. 1-5 may be implemented by hardware, software, firmware and/or any combination of hardware, software and/or firmware. Thus, for example, any of the example password generators 110 and/or 110A-C, the example password evaluators 115 and/or 115A-C, the example computing device 120, the example server 125, the example computing device 130, the example server 135, the example computing device 140, the example network 145, the example base password specifier 205, the example user interface implementer 210, the example time-varying parameter specifier 220, the example time-varying format specifier 225, the example time-varying offset specifier 230, the example time-varying position specifier 235, the example GUI 300, the example input password retriever 505, the example base password retriever 510, the example time-varying element determiner 520, the example time-varying parameter evaluator 530, the example format retriever 535, the example time-varying parameter formatter 540, the example offset retriever 545, the example comparator 555, the example base password parser 560, the example time-varying character parser 565 and/or, more generally, the example time-varying password authentication systems 105A, B, and/or C could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example time-varying password authentication systems 105A-C, the example password generators 110 and/or 110A-C, the example password evaluators 115 and/or 115A-C, the example computing device 120, the example server 125, the example computing device 130, the example server 135, the example computing device 140, the example network 145, the example base password specifier 205, the example user interface implementer 210, the example time-varying parameter specifier 220, the example time-varying format specifier 225, the example time-varying offset specifier 230, the example time-varying position specifier 235, the example GUI 300, the example input password retriever 505, the example base password retriever 510, the example time-varying element determiner 520, the example time-varying parameter evaluator 530, the example format retriever 535, the example time-varying parameter formatter 540, the example offset retriever 545, the example comparator 555, the example base password parser 560 and/or the example time-varying character parser 565 is/are hereby expressly defined to include a tangible computer readable storage device or storage disk such as a memory, a digital versatile disk (DVD), a compact disk (CD), a Blu-ray disk, etc. storing the software and/or firmware. Further still, the example time-varying password authentication systems 105A-C may include one or more elements, processes and/or devices in addition to, or instead of, those illustrated in FIGS. 1-5, and/or may include more than one of any or all of the illustrated elements, processes and devices.

Figure 6:
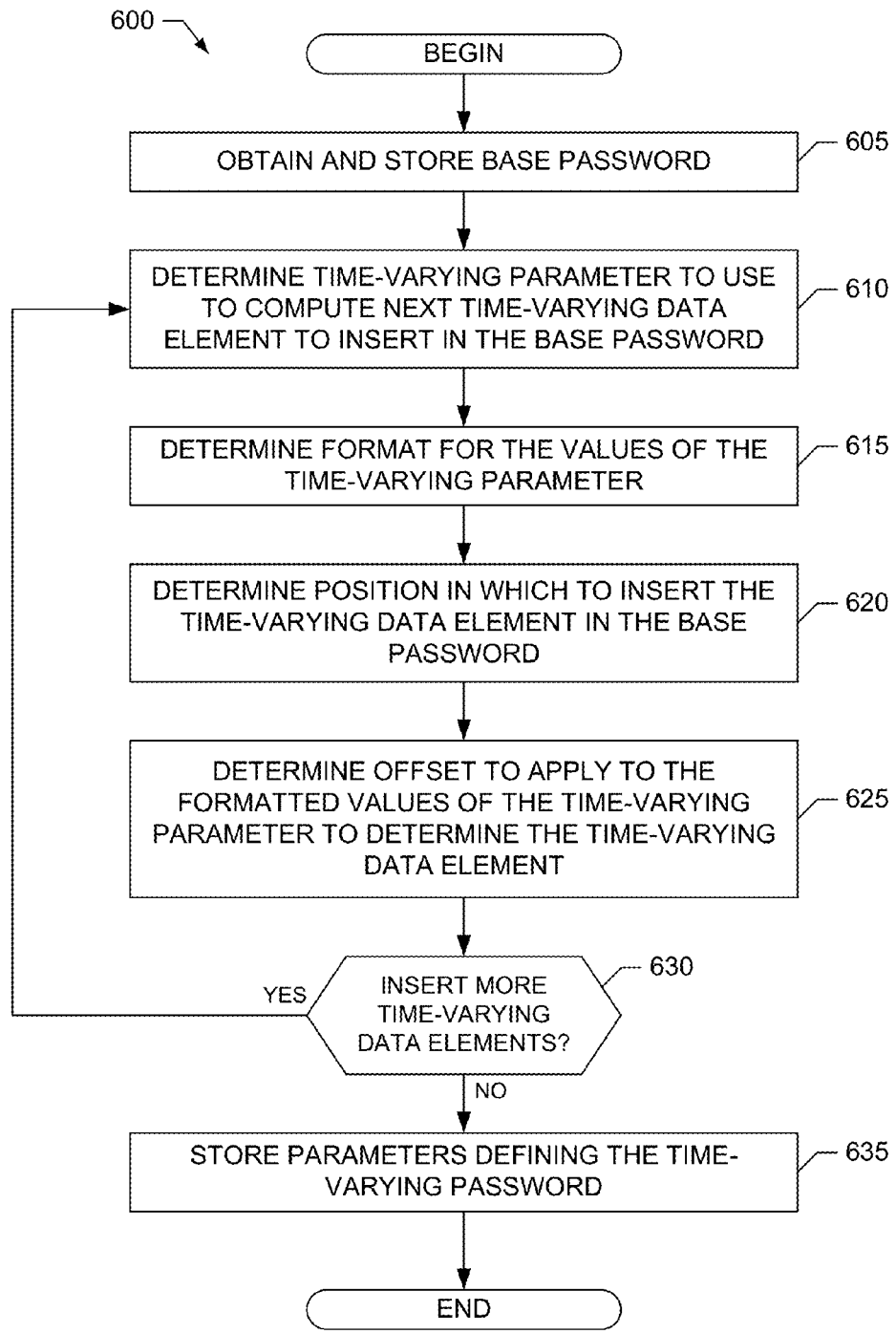
FIG. 6 is a flowchart representative of example machine readable instructions that may be executed to implement the example time-varying password generator of FIG. 2.
Figure 7:
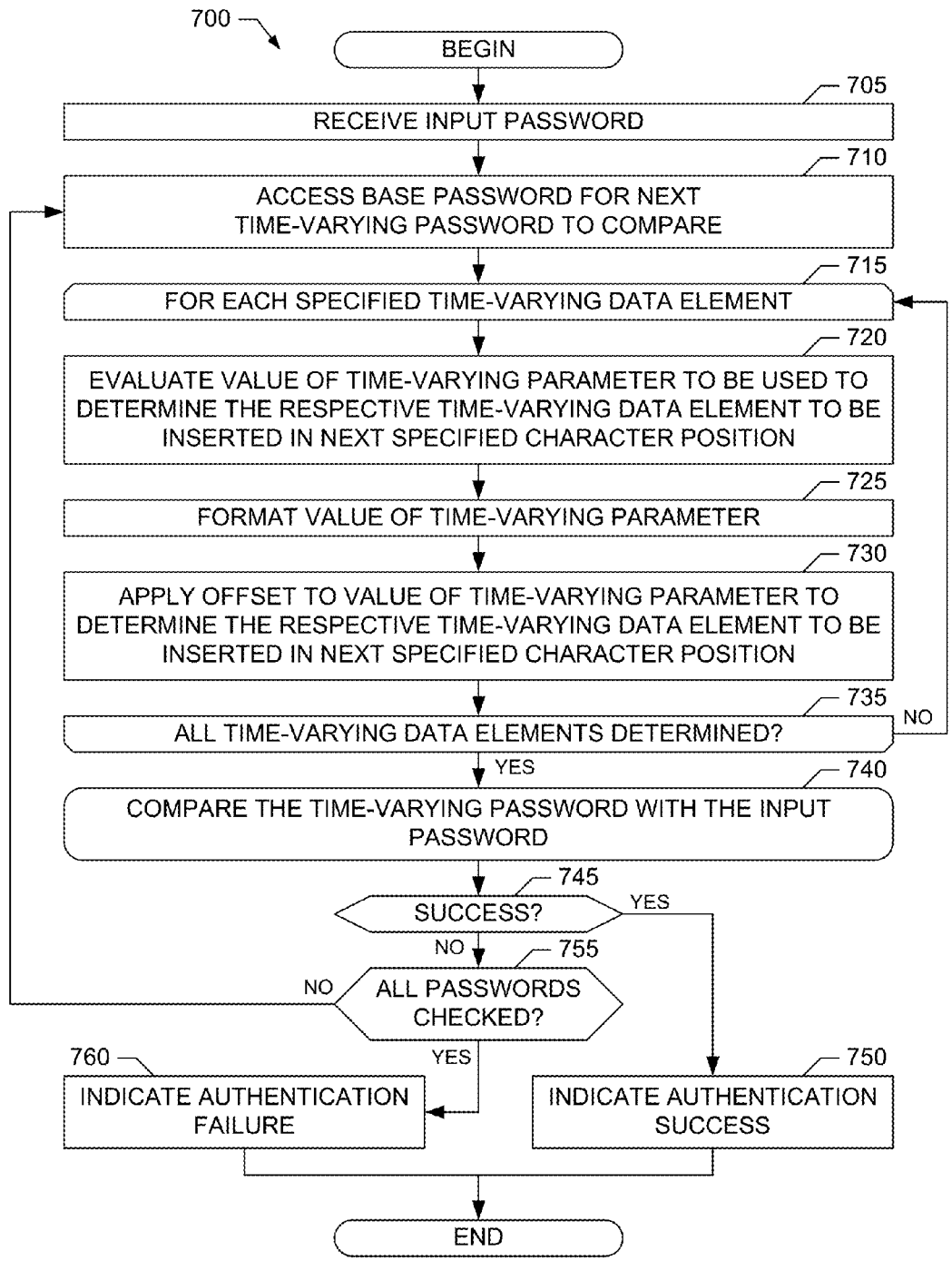
FIG. 7 is a flowchart representative of example machine readable instructions that may be executed to implement the example time-varying password evaluator of FIG. 5.
Figure 8:
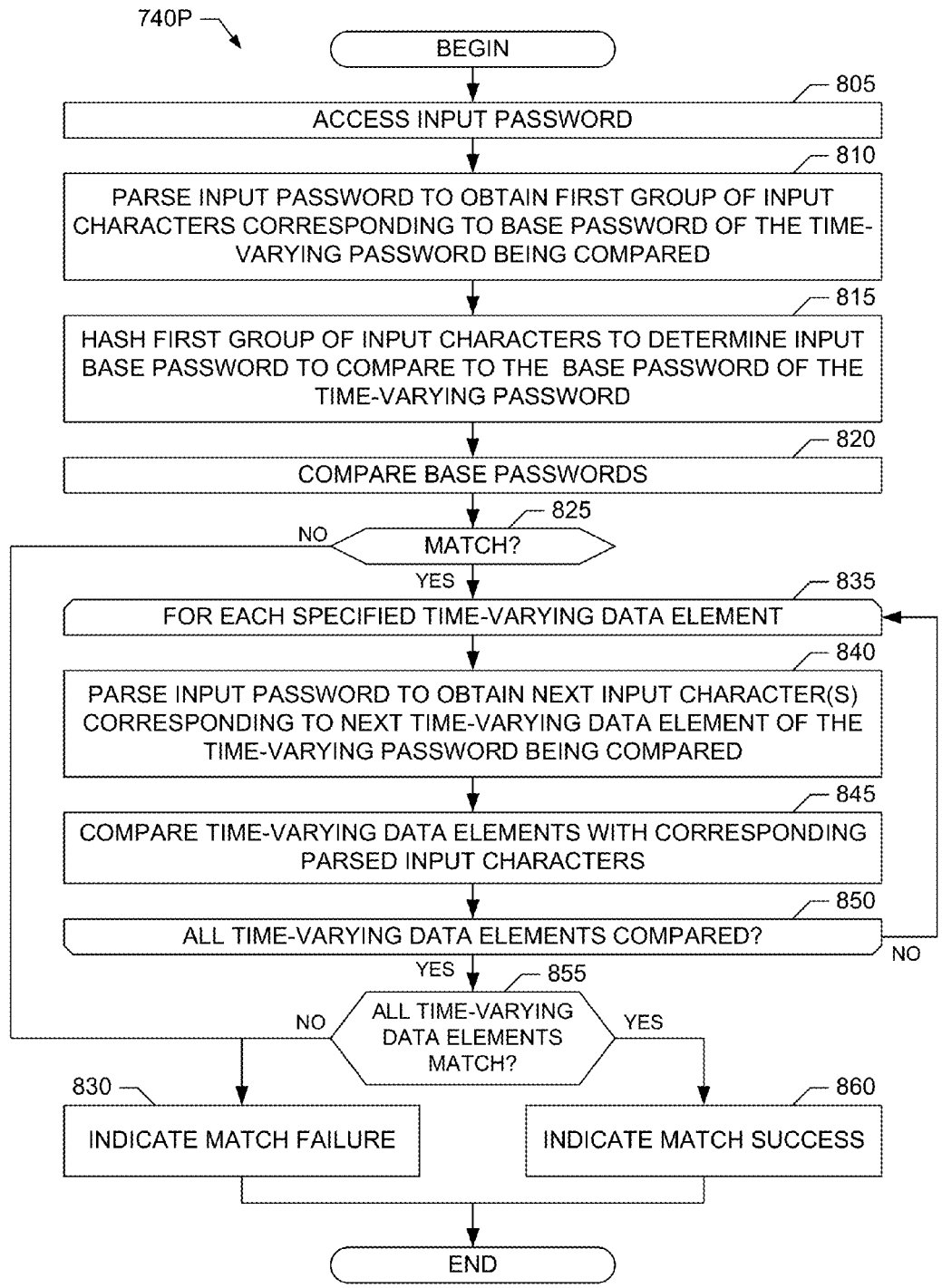
FIG. 8 is a flowchart representative of example machine readable instructions that may be executed to implement password comparison for the example time-varying password evaluator of FIG. 5.

Flowcharts representative of example machine readable instructions for implementing the example time-varying password authentication systems 105A-C, the example password generators 110 and/or 110A-C, the example password evaluators 115 and/or 115A-C, the example computing device 120, the example server 125, the example computing device 130, the example server 135, the example computing device 140, the example network 145, the example base password specifier 205, the example user interface implementer 210, the example time-varying parameter specifier 220, the example time-varying format specifier 225, the example time-varying offset specifier 230, the example time-varying position specifier 235, the example GUI 300, the example input password retriever 505, the example base password retriever 510, the example time-varying element determiner 520, the example time-varying parameter evaluator 530, the example format retriever 535, the example time-varying parameter formatter 540, the example offset retriever 545, the example comparator 555, the example base password parser 560 and/or the example time-varying character parser 565 are shown in FIGS. 6-8. In these examples, the machine readable instructions comprise one or more programs for execution by a processor, such as the processors 912 and/or 1012 shown in the example processor platforms 900 and 1000 discussed below in connection with FIGS. 9-10. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processors 912 and/or 1012, but the entire program or programs and/or portions thereof could alternatively be executed by a device other than the processor 912 and/or 1012, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-8, many other methods of implementing the example time-varying password authentication systems 105A-C, the example password generators 110 and/or 110A-C, the example password evaluators 115 and/or 115A-C, the example computing device 120, the example server 125, the example computing device 130, the example server 135, the example computing device 140, the example network 145, the example base password specifier 205, the example user interface implementer 210, the example time-varying parameter specifier 220, the example time-varying format specifier 225, the example time-varying offset specifier 230, the example time-varying position specifier 235, the example GUI 300, the example input password retriever 505, the example base password retriever 510, the example time-varying element determiner 520, the example time-varying parameter evaluator 530, the example format retriever 535, the example time-varying parameter formatter 540, the example offset retriever 545, the example comparator 555, the example base password parser 560 and/or the example time-varying character parser 565 may alternatively be used. For example, with reference to the flowcharts illustrated in FIGS. 6-8, the order of execution of the blocks may be changed, and/or some of the blocks described may be changed, eliminated, combined and/or subdivided into multiple blocks.

As mentioned above, the example processes of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-8 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

An example program 600 that may be executed to implement one or more of the example password generators 110 and/or 110A-C is represented by the flowchart shown in FIG. 6. For convenience and without loss of generality, the example program 600 is described from the perspective of implementation by the example password generator 110 of FIG. 2. With reference to the preceding figures and associated written descriptions, the example program 600 of FIG. 6 begins execution at block 605 at which the example base password specifier 205 of the password generator 110 obtains a base password to be used to create a time-varying password for a user, and stores the base password in an example base password storage 215, as described above. At block 610, the example time-varying parameter specifier 220 of the password generator 110 determines a time-varying parameter to be used compute a next time-varying data element to be inserted in the base password to determine the time-varying password, as described above. At block 615, the example time-varying format specifier 225 of the password generator 110 determines a format to represent the value of the time-varying parameter, as described above. At block 620, the example time-varying position specifier 235 of the password generator 110 determines the character position at which the time-varying data element being specified in the current processing iteration is to be inserted in the base password, as described above. At block 625, the example time-varying offset specifier 230 of the password generator 110 determines an offset to be applied to the value (e.g., after formatting) of the time-varying parameter to determine the time-varying data element to be inserted at the specified position of the base password, as described above.

At block 630, the password generator 110 determines (e.g., based on an input received by the example user interface implementer 210 of the password generator 110) whether another time-varying data element is to be inserted in the base password to create the time-varying password for the user. If another time-varying data element is to be inserted (block 630), processing returns to block 610 and blocks subsequent thereto to permit specification of another time-varying data element. However, if no further time-varying data element is to be inserted (block 630), at block 635 the password generator 110 stores password parameters specifying the time-varying data element(s) of the time-varying password in the example password parameter storage 525, as described above. Execution of the example program 600 then ends.

An example program 700 that may be executed to implement one or more of the example password evaluators 115 and/or 115A-C is represented by the flowchart shown in FIG. 7. For convenience and without loss of generality, the example program 700 is described from the perspective of implementation by the example password evaluator 115 of FIG. 5. With reference to the preceding figures and associated written descriptions, the example program 700 of FIG. 7 begins execution at block 705 at which the example input password retriever 505 of the password evaluator 115 accesses an input password to be compared against one or more time-varying passwords, as described above. At block 710, the example base password retriever 510 of the password evaluator 115 accesses (e.g., from the example base password storage 515) the base password for the next time-varying password to compare with the input password, as described above. At block 715, the example time-varying element determiner 520 begins computing the time-varying data element(s) (e.g., specified by password parameters accessed from the example password parameter storage 525) included in the time-varying password being evaluated.

For example, at block 720, the example time-varying parameter evaluator 530 of the password evaluator 115 evaluates, as described above, the present value of the time-varying parameter specified (e.g., by the password parameters accessed from the example password parameter storage 525) for use in computing the next time-varying data element for the time-varying password being evaluated. At block 725, the example time-varying parameter formatter 540 of the password evaluator 115 formats, as described above, the value of the time-varying parameter determined at block 720 according to a specified format (e.g., as determined by the password parameters accessed from the example password parameter storage 525). At block 730, the time-varying element determiner 520 applies a specified offset (e.g., as determined by the password parameters accessed from the example password parameter storage 525) to the value (e.g., after formatting) of the time-varying parameter to determine the time-varying data element. At block 735, the time-varying element determiner 520 continues to determine time-varying data elements until all the time-varying data elements specified for inclusion in the time-varying password have been determined.

At block 740, the example comparator 555 of the password evaluator 115 compares the input password with the time-varying password evaluated by the processing at blocks 710 to 735. An example program that may be used to implement the processing at block 740 is illustrated in FIG. 8 and described in further detail below. At block 745, the comparator 555 determines whether comparison of the input password with the time-varying password yielded a match success. If the passwords matched (block 745), then at block 750 the comparator 555 indicates that authentication was successful. However, if the passwords did not match (block 745), at block 755 the password evaluator 115 determines whether there are more time-varying passwords available to compare with the input password (e.g., such as when more than one possible time-varying password has been generated for and associated with a given user's username). If more time-varying passwords are available (block 755), then processing returns to block 710 and blocks subsequent thereto at which the password evaluator 115 evaluates the next time-varying password to compare with the input password. However, if no more time-varying passwords are available (block 755), then at block 760 the comparator 555 indicates that authentication was unsuccessful. Execution of the example program 700 then ends.

An example program 740P that may be used to perform the processing at block 740 of FIG. 7 is illustrated in FIG. 8. For convenience and without loss of generality, the example program 700 is described from the perspective of implementation by the example password evaluator 115 of FIG. 5. With reference to the preceding figures and associated written descriptions, the example program 740P of FIG. 8 begins execution at block 805 at which the example base password parser 560 of the password evaluator 115 accesses the input password being compared with an evaluated time-varying password. At block 810, the base password parser 560 parses the input password, as described above, to obtain the group of input characters corresponding to the base password of the time-varying password being compared. At block 815, the base password parser 560 hashes (or otherwise encrypts), if appropriate, the group of characters obtained at block 805 to determine an input base password, as described above, to compare with the base password of the time-varying password. At block 820, the comparator 555 of the password evaluator 115 compares the base passwords. If the base passwords do not match (block 825), then at block 830 the comparator 555 determines that the input password failed to match the given time-varying password being compared.

However, if the base passwords matched (block 825), then at block 835 the comparator 555 begins comparing each time-varying data element in the time-varying password with the corresponding input characters in the input password. For example, at block 840, the example time-varying character parser 565 of the password evaluator 115 parses the input password, e.g., using the character position(s) specified for the corresponding time-varying data element(s) of the time-varying password as described above, to obtain the next input character(s) corresponding to the next time-varying data element in the time-varying password. At block 845, the comparator 555 compares this time-varying data element with the corresponding input character(s) from the input password, as described above. At block 850, the comparator 555 continues comparing the time-varying data element of the time-varying password with the corresponding input characters parsed from the input password. At block 855, the comparator 555 determines whether all the time-varying data elements matched the corresponding input characters parsed from the input password. If all matches were successful (block 855), then at block 860 the comparator 555 determines that the input password matched the given time-varying password being compared. However, if at least one match was not successful (block 855), then at block 830 the comparator 555 determines that the input password failed to match the given time-varying password being compared. Execution of the example program 740P then ends.

Figure 9:
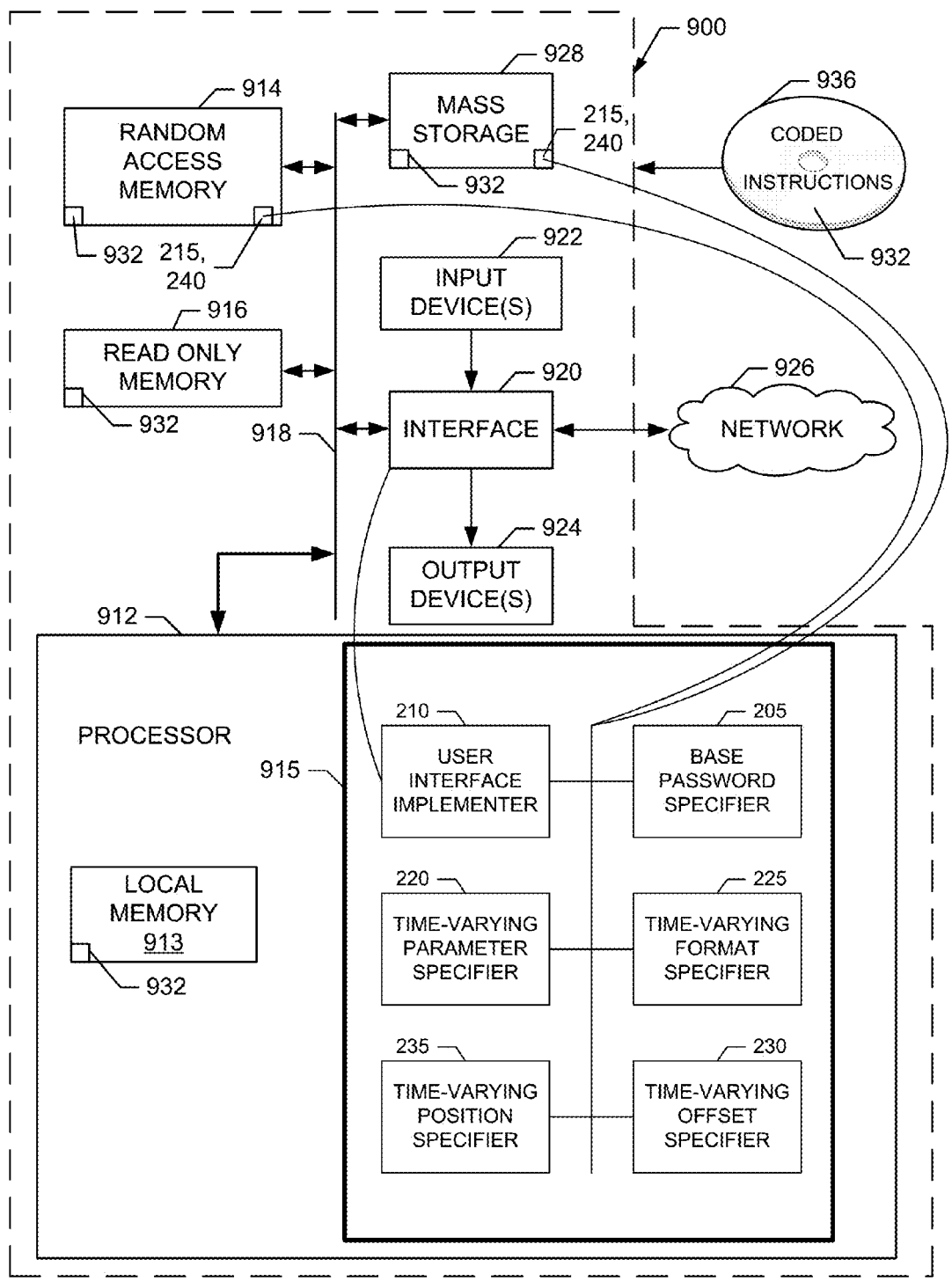
FIG. 9 is a block diagram of an example processor platform structured to execute the example machine readable instructions of FIG. 6 to implement the example time-varying password generator of FIG. 2.

FIG. 9 is a block diagram of an example processor platform 900 capable of executing the instructions of FIG. 6 to implement the example password generator 110 of FIG. 2. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example of FIG. 9, the processor 912 includes one or more example processing cores 915 configured via example instructions 932 to implement the example password generator 110, the example base password specifier 205, the example user interface implementer 210, the example time-varying parameter specifier 220, the example time-varying format specifier 225, the example time-varying offset specifier 230 and/or the example time-varying position specifier 235 of FIG. 2.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID (redundant array of independent disks) systems, and digital versatile disk (DVD) drives. In some examples, the mass storage device 928 may implement the example base password storage 215 and/or the example password parameter storage 240. Additionally or alternatively, in some examples the volatile memory 914 may implement the example base password storage 215 and/or the example password parameter storage 240.

Coded instructions 932 corresponding to the instructions of FIG. 6 may be stored in the mass storage device 928, in the volatile memory 914, in the non-volatile memory 916, in the local memory 913 and/or on a removable tangible computer readable storage medium, such as a CD or DVD 936.

Figure 10:
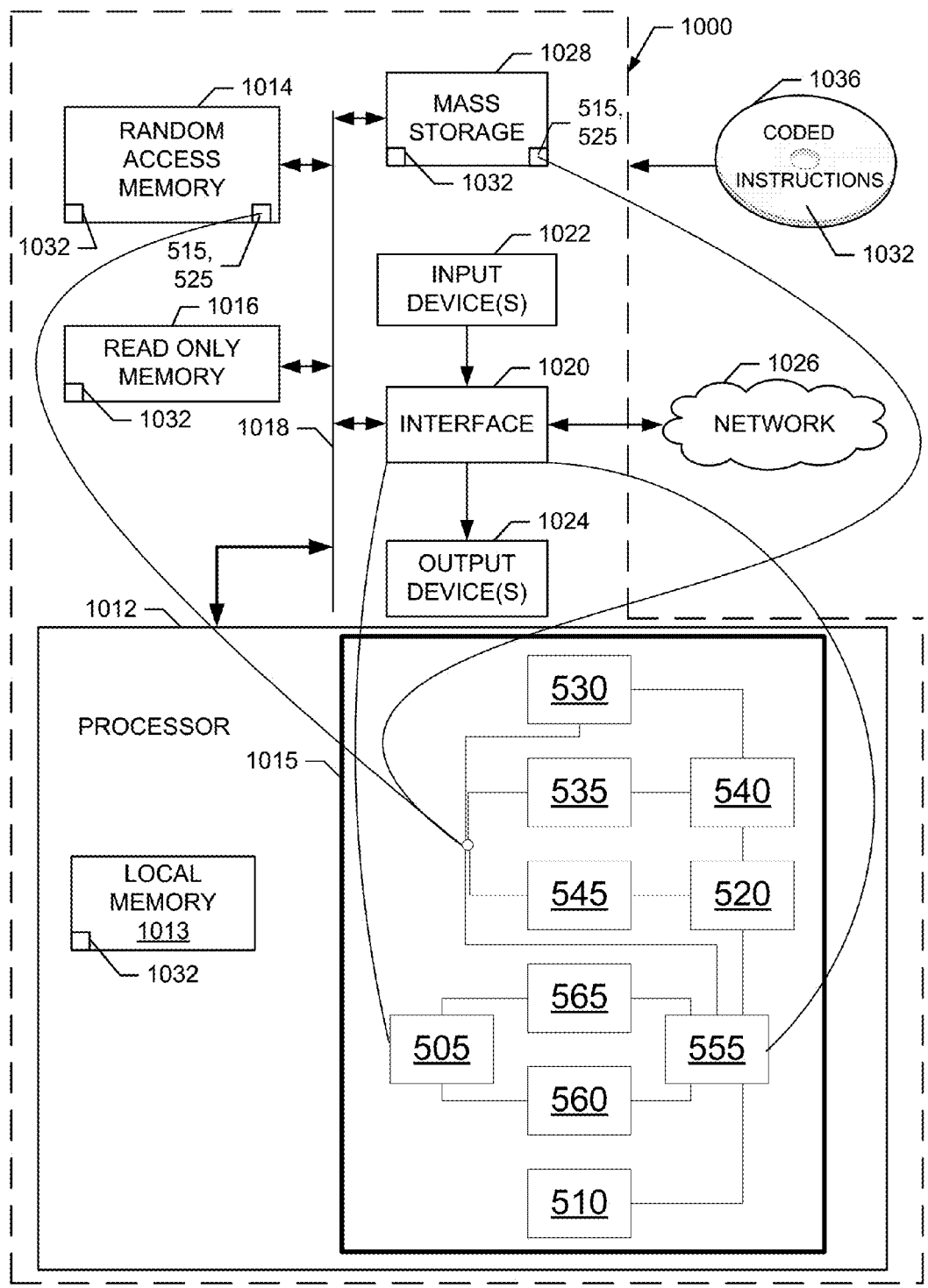
FIG. 10 is a block diagram of an example processor platform structured to execute the example machine readable instructions of FIGS. 7 and/or 8 to implement the example time-varying password evaluator of FIG. 5.

FIG. 10 is a block diagram of an example processor platform 1000 capable of executing the instructions of FIGS. 7 and/or 8 to implement the example password evaluator 115 of FIG. 5. The processor platform 1000 can be, for example, a server, a personal computer, a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box a digital camera, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 10, the processor 1012 includes one or more example processing cores 1015 configured via example instructions 1032 to implement the example password evaluator 115, the example input password retriever 505, the example base password retriever 510, the example time-varying element determiner 520, the example time-varying parameter evaluator 530, the example format retriever 535, the example time-varying parameter formatter 540, the example offset retriever 545, the example comparator 555, the example base password parser 560 and/or the example time-varying character parser 565 of FIG. 5.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by SDRAM, DRAM, RDRAM and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., an LED, an OLED, a liquid crystal display, a CRT display, a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a DSL, a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and DVD drives. In some examples, the mass storage device 1028 may implement the example base password storage 515 and/or the example password parameter storage 525. Additionally or alternatively, in some examples the volatile memory 1014 may implement the example base password storage 515 and/or the example password parameter storage 525.

Coded instructions 1032 corresponding to the instructions of FIGS. 7 and/or 8 may be stored in the mass storage device 1028, in the volatile memory 1014, in the non-volatile memory 1016, in the local memory 1013 and/or on a removable tangible computer readable storage medium, such as a CD or DVD 1036.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method for password generation, the method comprising:
   obtaining, by executing an instruction with a processor, a base password including a plurality of characters;
   implementing, by executing an instruction with the processor, a user interface to accept an input specifying a first character position of the base password at which a first time-varying data element is to be inserted to determine a time-varying password, the first time-varying data element to be computed by a computing device based on a time-varying parameter; and
   determining, by executing an instruction with the processor, a first offset to be applied by the computing device to a value of the time-varying parameter to compute the first time-varying data element.

2. The method of claim 1, further including determining a data format for the value of the time-varying parameter, the data format being one of a plurality of possible data formats for representing values of the time-varying parameter.

3. The method of claim 2, wherein the data format is a first data format, and further including:
   determining a second character position of the base password at which a second time-varying data element is to be inserted to determine the time-varying password, the second time-varying data element to be computed by the computing device based on the time-varying parameter;
   determining a second offset different from the first offset to be applied by the computing device to the value of the time-varying parameter to compute the second time-varying data element; and
   determining a second data format from the plurality of possible data formats to be applied by the computing device to the value of the time-varying parameter to compute the second time-varying data element.

4. The method of claim 1, wherein the time-varying parameter is a first time-varying parameter, and further including determining a second character position of the base password at which a second time-varying data element is to be inserted to determine the time-varying password, the second time-varying data element to be computed by the computing device based on a second time-varying parameter different from the first time-varying parameter.

5. The method of claim 4, wherein the first time-varying parameter is a time-of-day parameter determined based on a system clock of the computing device, and the second time-varying parameter is a day-of-month parameter determined based on the system clock of the computing device.

6. The method of claim 1, wherein the value of the time-varying parameter is to be represented by a first numerical value, and the offset is a second numerical value to be added to the value of the time-varying parameter to compute the first time-varying data element.

7. The method of claim 1, further including:
implementing the user interface to permit entry of the base password, the first character position, the time-varying parameter and the first offset; and
storing the base password, the first character position, the time-varying parameter and the first offset to permit determination of the time-varying password by the computing device.

8. A non-transitory computer readable medium comprising computer readable instructions which, when executed, cause a machine to perform operations comprising:
obtaining a base password including a plurality of characters;
implementing a user interface to accept an input specifying a first character position of the base password at which a first time-varying data element is to be inserted to determine a time-varying password, the first time-varying data element to be computed based on a time-varying parameter; and
determining a first offset to be applied to a value of the time-varying parameter to compute the first time-varying data element.

9. The non-transitory computer readable medium of claim 8, wherein the operations further include determining a data format for the value of the time-varying parameter, the data format being one of a plurality of possible data formats for representing values of the time-varying parameter.

10. The non-transitory computer readable medium of claim 9, wherein the data format is a first data format, and the operations further include:
determining a second character position of the base password at which a second time-varying data element is to be inserted to determine the time-varying password, the second time-varying data element to be computed based on the time-varying parameter;
determining a second offset different from the first offset to be applied to the value of the time-varying parameter to compute the second time-varying data element; and
determining a second data format from the plurality of possible data formats to be applied to the value of the time-varying parameter to compute the second time-varying data element.

11. The non-transitory computer readable medium of claim 8, wherein the time-varying parameter is a first time-varying parameter, and the operations further include determining a second character position of the base password at which a second time-varying data element is to be inserted to determine the time-varying password, the second time-varying data element to be computed based on a second time-varying parameter different from the first time-varying parameter.

12. The non-transitory computer readable medium of claim 11, wherein the first time-varying parameter is a time-of-day parameter determined based on a system clock, and the second time-varying parameter is a day-of-month parameter determined based on the system clock.

13. The non-transitory computer readable medium of claim 8, wherein the value of the time-varying parameter is to be represented by a first numerical value, and the offset is a second numerical value to be added to the value of the time-varying parameter to compute the first time-varying data element.

14. The non-transitory computer readable medium of claim 8, wherein the operations further include:
implementing the user interface to permit entry of the base password, the first character position, the time-varying parameter and the first offset; and
storing the base password, the first character position, the time-varying parameter and the first offset to permit determination of the time-varying password.

15. An apparatus for password generation, the apparatus comprising:
memory including machine readable instructions; and
a processor to execute the machine readable instructions to perform operations including:
obtaining a base password including a plurality of characters;
accepting a user input specifying a first character position of the base password at which a first time-varying data element is to be inserted to determine a time-varying password, the first time-varying data element to be computed based on a time-varying parameter; and
determining a first offset to be applied to a value of the time-varying parameter to compute the first time-varying data element.

16. The apparatus of claim 15, wherein the operations further include determining a data format for the value of the time-varying parameter, the data format being one of a plurality of possible data formats for representing values of the time-varying parameter.

17. The apparatus of claim 16, wherein the data format is a first data format, and the operations further include:
determining a second character position of the base password at which a second time-varying data element is to be inserted to determine the time-varying password, the second time-varying data element to be computed based on the time-varying parameter;
determining a second offset different from the first offset to be applied to the value of the time-varying parameter to compute the second time-varying data element; and
determining a second data format from the plurality of possible data formats to be applied to the value of the time-varying parameter to compute the second time-varying data element.

18. The apparatus of claim 15, wherein the time-varying parameter is a first time-varying parameter, and the operations further include determining a second character position of the base password at which a second time-varying data element is to be inserted to determine the time-varying password, the second time-varying data element to be computed based on a second time-varying parameter different from the first time-varying parameter.

19. The apparatus of claim 18, wherein the first time-varying parameter is a time-of-day parameter determined based on a system clock, and the second time-varying parameter is a day-of-month parameter determined based on the system clock.

20. The apparatus of claim 15, wherein the operations further include:
implementing the user interface to permit entry of the base password, the first character position, the time-varying parameter and the first offset; and
storing the base password, the first character position, the time-varying parameter and the first offset to permit determination of the time-varying password.

* * * * *